(12) United States Patent
Abzarian et al.

(10) Patent No.: US 8,176,157 B2
(45) Date of Patent: May 8, 2012

(54) EXCEPTIONS GROUPING

(75) Inventors: David Abzarian, Kirkland, WA (US);
David C. Tamasi, Seattle, WA (US);
Noah Horton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 11/436,804

(22) Filed: May 18, 2006

(65) Prior Publication Data

US 2007/0271361 A1    Nov. 22, 2007

(51) Int. Cl.
*G06F 15/173* (2006.01)
*G06F 9/00* (2006.01)
*G06F 7/04* (2006.01)

(52) U.S. Cl. ........ 709/223; 709/224; 709/225; 709/226; 726/11; 726/21

(58) Field of Classification Search .................. 709/223, 709/224, 225, 226; 726/11–21
See application file for complete search history.

(56) References Cited

U.S. PATENT DOCUMENTS

| | | |
|---|---|---|
| 5,606,668 A | 2/1997 | Shwed |
| 5,802,591 A | 9/1998 | Yachida |
| 5,835,726 A | 11/1998 | Shwed et al. |
| 5,919,258 A | 7/1999 | Kayashima et al. |
| 5,968,176 A | 10/1999 | Nessett et al. |
| 5,974,549 A | 10/1999 | Golan |
| 5,987,611 A | 11/1999 | Freund |
| 6,003,084 A | 12/1999 | Green et al. |
| 6,003,133 A | 12/1999 | Moughanni et al. |
| 6,009,469 A | 12/1999 | Mattaway et al. |
| 6,009,475 A | 12/1999 | Shrader |
| 6,088,804 A | 7/2000 | Hill et al. |
| 6,131,163 A | 10/2000 | Wiegel |
| 6,149,585 A | 11/2000 | Gray |
| 6,154,775 A | 11/2000 | Coss et al. |
| 6,212,558 B1 * | 4/2001 | Antur et al. .................... 709/221 |
| 6,219,706 B1 | 4/2001 | Fan et al. |
| 6,253,321 B1 | 6/2001 | Nikander et al. |
| 6,347,376 B1 | 2/2002 | Attwood et al. |
| 6,466,976 B1 | 10/2002 | Alles et al. |
| 6,480,959 B1 | 11/2002 | Granger et al. |
| 6,496,935 B1 | 12/2002 | Fink et al. |
| 6,513,122 B1 | 1/2003 | Magdych et al. |
| 6,611,875 B1 | 8/2003 | Chopra et al. |
| 6,631,466 B1 | 10/2003 | Chopra et al. |
| 6,636,989 B1 | 10/2003 | Ludovici et al. |
| 6,643,776 B1 | 11/2003 | Boden |
| 6,697,810 B2 | 2/2004 | Kumar et al. |
| 6,721,890 B1 | 4/2004 | Shrikhande |
| 6,792,615 B1 | 9/2004 | Rowe et al. |

(Continued)

FOREIGN PATENT DOCUMENTS

EP    0910197 A2    4/1999

(Continued)

OTHER PUBLICATIONS

International Search Report No. PCT/US2007/011637, Dated: Dec. 28, 2007. pp. 1-7.

(Continued)

*Primary Examiner* — Karen Tang (57) ABSTRACT

Methods of experience-based exception grouping are described. A number of exceptions are read. The exceptions are intelligently associated with one of a number of exception groups. Each exception group corresponds to a common user experience.

20 Claims, 6 Drawing Sheets

U.S. PATENT DOCUMENTS

| | | | |
|---|---|---|---|
| 6,931,529 B2 | 8/2005 | Kunzinger | |
| 6,938,155 B2 | 8/2005 | D'Sa et al. | |
| 6,941,474 B2 | 9/2005 | Boies et al. | |
| 6,944,183 B1* | 9/2005 | Iyer et al. | 370/466 |
| 6,976,177 B2 | 12/2005 | Ahonen | |
| 7,016,901 B2 | 3/2006 | Eikenbery | |
| 7,024,460 B2 | 4/2006 | Koopmas et al. | |
| 7,120,931 B1 | 10/2006 | Cheriton | |
| 7,290,145 B2 | 10/2007 | Falkenthros | |
| 7,308,711 B2 | 12/2007 | Swander et al. | |
| 7,567,560 B1 | 7/2009 | Balasubramaniyan | |
| 7,761,708 B2 | 7/2010 | Swander et al. | |
| 2001/0013049 A1 | 8/2001 | Ellis, III et al. | |
| 2002/0038371 A1 | 3/2002 | Spacey | |
| 2002/0097724 A1 | 7/2002 | Halme et al. | |
| 2002/0143855 A1 | 10/2002 | Traversat et al. | |
| 2002/0162026 A1 | 10/2002 | Neuman et al. | |
| 2002/0194049 A1 | 12/2002 | Boyd | |
| 2003/0005328 A1 | 1/2003 | Grewal et al. | |
| 2003/0028806 A1 | 2/2003 | Govindarajan et al. | |
| 2003/0084331 A1 | 5/2003 | Dixon et al. | |
| 2003/0084334 A1 | 5/2003 | Miyao et al. | |
| 2003/0110379 A1 | 6/2003 | Ylonen et al. | |
| 2003/0120809 A1 | 6/2003 | Bellur et al. | |
| 2003/0233568 A1 | 12/2003 | Maufer et al. | |
| 2004/0003290 A1* | 1/2004 | Malcolm | 713/201 |
| 2004/0037268 A1 | 2/2004 | Read | |
| 2004/0078600 A1 | 4/2004 | Nilsen et al. | |
| 2004/0148439 A1 | 7/2004 | Harvey et al. | |
| 2004/0168150 A1* | 8/2004 | Ziv | 717/116 |
| 2004/0177273 A1 | 9/2004 | Ghaffar | |
| 2004/0205211 A1 | 10/2004 | Takeda et al. | |
| 2004/0250131 A1 | 12/2004 | Swander et al. | |
| 2004/0250158 A1 | 12/2004 | Le Pennec et al. | |
| 2005/0005165 A1 | 1/2005 | Morgan et al. | |
| 2005/0010816 A1 | 1/2005 | Yu et al. | |
| 2005/0022010 A1 | 1/2005 | Swander et al. | |
| 2005/0022011 A1 | 1/2005 | Swander et al. | |
| 2005/0079858 A1 | 4/2005 | Rosen et al. | |
| 2005/0091068 A1 | 4/2005 | Ramamoorthy et al. | |
| 2005/0138380 A1 | 6/2005 | Fedronic et al. | |
| 2005/0182967 A1 | 8/2005 | Phillips et al. | |
| 2005/0198384 A1 | 9/2005 | Ansari et al. | |
| 2005/0204402 A1* | 9/2005 | Turley et al. | 726/11 |
| 2005/0229246 A1 | 10/2005 | Rajagopal et al. | |
| 2005/0262554 A1* | 11/2005 | Brooks et al. | 726/11 |
| 2005/0283823 A1 | 12/2005 | Okajo et al. | |
| 2006/0015935 A1 | 1/2006 | Dixon et al. | |
| 2006/0062238 A1 | 3/2006 | Mahendran et al. | |
| 2006/0101266 A1 | 5/2006 | Klassen et al. | |
| 2006/0253901 A1 | 11/2006 | Roddy et al. | |
| 2007/0118893 A1* | 5/2007 | Crawford | 726/11 |
| 2007/0174031 A1* | 7/2007 | Levenshteyn et al. | 703/13 |
| 2007/0250922 A1 | 10/2007 | Horton et al. | |
| 2007/0261111 A1 | 11/2007 | Roberts | |

FOREIGN PATENT DOCUMENTS

| | | |
|---|---|---|
| EP | 1024627 A2 | 8/2000 |
| EP | 1119151 | 7/2001 |
| EP | 14848601 A1 | 12/2004 |
| JP | 17-217757 A | 8/2005 |
| WO | WO03/090034 | 10/2003 |
| WO | WO2004010659 | 1/2004 |
| WO | WO2007136811 A3 | 11/2007 |

OTHER PUBLICATIONS

Cisco Catalyst 6500 and Cisco 7600 Firewall Services Module, Cisco Systems, Inc., Oct. 2005, available at http://www.cisco.com/application/pdf/en/us/guest/products/ps4452/c1031/cdccont_0900aecd80356e40.pdf.

German Information Security Agency (BSI) Firewall Study II, Ernst & Young and Sun Microsystems GmbH, May 2001, available at http://www.bsi.de/literat/studien/firewall/fw01eng/fwstude.pdf.

Firewalking A Traceroute-Like Analysis of IP Packet Responses to Determine Gateway Access Control Lists, Cambridge Technology Partners, Oct. 1998, available at http://www.packetfactory.net/firewalk/firewalk-final.html.

International Preliminary Report on Patentability and Written Opinion of the International Searching Authority for International Application No. PCT/US2007/012024, Dated Jan. 22, 2008.

Office Action from the Japanese Patent Office regarding Japanese Patent Application No. 2009-509784 dated Nov. 8, 2011.

Seiichi Sakaya, A dynamic policy control framework of IP network based on the session control information, The Institute of Electronics, Information and Communication Engineers Technical Report, vol. 104, No. 616, Japan, The Institute of Electronics, Information and Communication Engineers, Jan. 20, 2005, p. 1-4.

European Search Report regarding European Application No. 04009309.8 dated May 5, 2005.

Strassner et al., Policy Framework Core Information Model, Internet Draft, May 17, 1999, XP002255652.

Vagish et al., NT5.1 IPSecurity Security Policy Database, Microsoft Corporation, Sep. 1999.

Markham et al., Security at the Network Edge: A Distributed Firewall Architecture, Jun. 12-14, 2001, DARPA Information Survivability Conference & Exposition II, 2001. DISCEX '01. Proceedings.

McDonald et al., A Socket-Based Key Management API (and Surrounding Infrastructure), retrieved from http://www.isoc.orglisoclwhatislconferenceslinetl96/proceedsingsId7/d7 2htm on May 21, 2005.

Bellovin, "Computer Security—An End State?", Communications of the ACM, vol. 44. No. 3, Mar. 2001.

"Distributed Firewalls.com", Network-1 Security Solutions, Inc., at http://207.254.108.217/firewall.html, visited May 31, 2001.

"Whister Server Authorization in IPSec", IPSec development Team, Microsoft, May 2000.

"NT 6.0 User Authentication", IPSec Development Team, Microsoft, May 2000.

"NT 6.0 IPSecWinsock Extensions", IPSec Development Team, Nov. 2000.

Adoba, "The Authentication and Authorization Problem in Roaming", Network Working Group, Mar. 1997.

Narayan, Diameter Strong Securitiy Extension Using Kerberos v5, Network Working Group, Feb. 2001.

Narayan, Radius Securitiy Extensions Using Kerberos v5, Network Working Group, Aug. 2000.

Jiang, "Secure Radius Server Operation Guidelines for Dial Roaming", Network Working Group, Oct. 1997.

Aboba, "Certificate-Based Roaming", Network Working Group, Feb. 1999.

"IP Security for Microsoft Windows 2000 Server White Paper", Microsoft Windows 2000 Server Operating System, Microsoft Corporation, 1999.

LeBlanc, "Bind Basics", http://www.windowsitpro.comlWindowsSecurity/Article/ArticleID/9196/9196.html, Jun. 2000.

Harkins et al, RFC 2409, "The Internet Key Exchange (IKE)", Nov. 1998.

Rigney et al., Remote Authentication Dial In User Service (RADIUS), The Internet Society, Jun. 2000.

Rigney, "RADIUS Accounting", The Internet Society, Jun. 2000.

McDonald et al., "PF_KEY Key Management API, Version 2", The Internet Society, Jul. 1998.

Calhoun et al., "DIAMETER Base Protocol", The Internet Society, Apr. 2000.

Calhoun, Comparison of DIAMETER Against AAA Network Access Requirements, The Internet Society, Apr. 2000.

Calhoun et al., "DIAMETER Framework Document", The Internet Society, Apr. 2000.

Calhoun et al., "DIAMETER Secure Proxying", The Internet Society, Oct. 1999.

Calhoun et al., "DIAMETER Strong Security Extension", The Internet Society, Apr. 2000.

"UDDI Technical White Paper", Universal Description, Discovery and Integration (uddi.org), Ariba, Inc. International Business Machines Corporation, Sep. 2000.

"Host-Resident Firewalls: Defending Windows NTI2000 Servers and Desktops from Network Attacks, A Security White Paper", Network-1 Security Solutions, Inc., 2000.

Li, "Distributed Firewall", Dec. 2000.

Ioannidis et al., Implementing a Distributed Firewall, DARPA, Nov. 2000.

Office Action from The State Intellectual Property Office of the People's Republic of China regarding Application No. 200780016108.8 dated Mar. 22, 2011.

International Preliminary Report on Patentability, Written Opinion, and Search Report regarding International Application No. PCT/US2007/011053, Dated Oct. 14, 2008.

Aberer et al., "An Overview on Peer-to-Peer Information Systems," Workshop on Distributed Data and Structures (WDAS-2002), Mar. 2002.

Bellovin, "Distributed Firewall", issue of ;login, Nov. 1999.

Wolthusen, "Layered Multipoint Network Defense and Security Policy Enforcement," 2001 IEEE Workshop on Information Assurance and Security, Jun. 2001.

Office Action from the Japanese Patent Office regarding Japanese Patent Application No. 2009-509784 dated Feb. 8, 2012.

* cited by examiner

EXCEPTIONS GROUPING

TECHNICAL FIELD

Embodiments of the technology pertain to exceptions management methods.

BACKGROUND

A firewall is a piece of hardware and/or software that functions in a networked environment to control and/or prevent certain network traffic because of network security reasons. As different end-users often have different needs, a firewall usually can be customized by an end-user. In one example, an end-user may select one or more firewall exceptions to the firewall so that certain types of network traffic are allowed to pass. Specifically, in an operating system, a firewall control panel may allow an end-user to select one or more firewall exceptions (e.g., programs and/or services) to the firewall.

However, as operating systems evolve to become more sophisticated, the numbers of network facing services and features have increased as well. As a result, a firewall control panel can include a long list of firewall exceptions.

Unfortunately, a significant number of end-users may not be technically proficient to be able to understand and interact with such a long list of firewall exceptions. Not only would going through such a long list of firewall exceptions be time consuming, an end-user may not know which firewall exceptions to select.

Moreover, because different application program features associated with firewall exceptions may be interconnected functionally, an end-user that enables or disables a particular firewall exception may result in unintentionally impacting another application program feature.

SUMMARY

Technologies for experience-based exception grouping are disclosed. The technology includes reading exceptions. (e.g., accessing a list of firewall exceptions) The exceptions are intelligently associated with one or more of a number of exception groups. Each exception group corresponds to a user experience. Thus, rather than selectively choosing amongst a bewildering array of exceptions, ordinary users can intelligently toggle on/off certain exception groups.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

A firewall is an application program or hardware device that filters information (e.g., network traffic) coming through a network connection (e.g., Internet connection) to a computer system. In one example, if incoming packets of information is flagged by the firewall, it is not allowed through.

In general, although a computer user values the protection that a firewall provides, he or she is usually not interested in blocking all network traffic. Consequently, a firewall is usually equipped with a set of firewall exceptions that a computer user can select to allow certain types of information to pass through.

With conventional operating systems, different firewall exceptions may be presented in a list format to a computer user. However, as operating systems become more complex and the number of network facing features increase, the list of firewall exceptions expanded as well. As the average computer user does not have a high level of expertise with regards to network protocols and computer security, the management of a long list of firewall exceptions evolved into a daunting task.

For a particular network-facing application feature or function, multiple firewall exceptions may need to be enabled for the application program to operate properly. Under conventional approaches, a computer user may be required to read through a long list of firewall exceptions to enable all the related firewall exceptions. Not only is this excessively time consuming, a mistake can cause another application program to malfunction and/or render the firewall worthless as a security tool.

In contrast to conventional approaches, embodiments effectively reduce the complexity involved in firewall exceptions management and present a more efficient way for a computer user to manage network traffic. In one example, a plurality of firewall exceptions is read. The plurality of firewall exceptions are then intelligently associated with one or more of a plurality of firewall exception groups, and each firewall exception group corresponds to a common user experience (e.g., a user experience associated with a particular application program).

By grouping exceptions based on a common user experience, embodiments create a simpler and more user-friendly firewall management experience. Also, the attack surface for a user is minimized through the use of previously invisible exception types. The exceptions, in one example, are not made visible because the exceptions may be too complex for an average user to understand and/or control. Furthermore, all dependencies for a particular experience are ensured to be enabled simultaneously.

Figure 1:
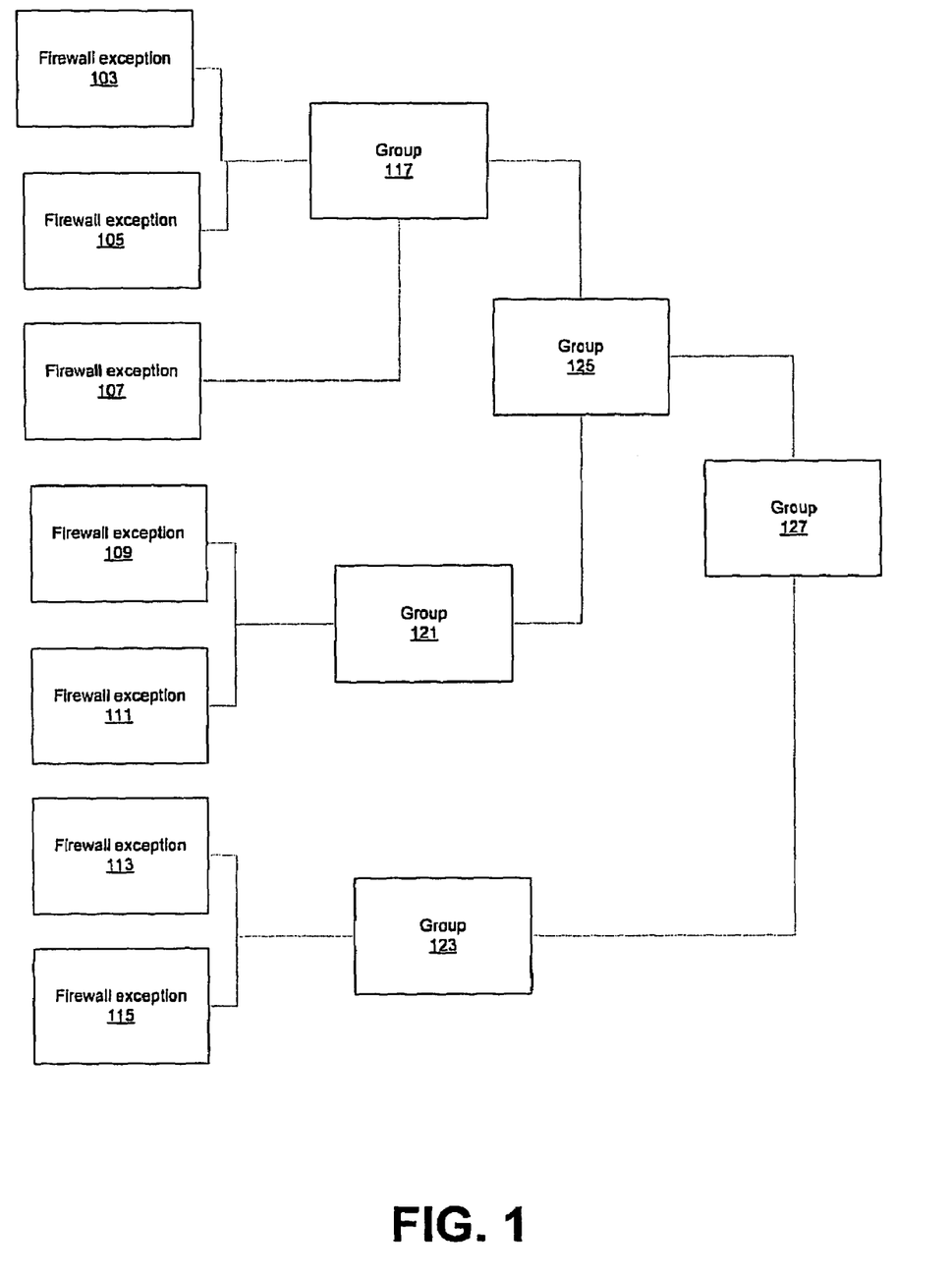
FIG. 1 illustrates block diagrams of a system for grouping firewall exceptions in accordance with an embodiment of the present claimed subject matter.

FIG. 1 illustrates block diagrams of a system 100 for grouping firewall exceptions in accordance with an embodiment of the present claimed subject matter. System 100 includes firewall exception 103, firewall exception 105, firewall exception 107, firewall exception 109, firewall exception 111, firewall exception 113, firewall exception 115, Group 117, Group 121, Group 123, Group 125, and Group 127.

Although system 100 is shown and described as having certain numbers and types of elements, the present claimed subject matter is not so limited; that is, system 100 may include elements other than those shown, and may include more than one of the elements that are shown. For example, system 100 can include a greater or fewer number of firewall exceptions than the seven (firewall exception 103, firewall exception 105, firewall exception 107, firewall exception 109, firewall exception 111, firewall exception 113, and firewall exception 115) shown.

In one embodiment, the plurality of firewall exceptions (e.g., firewall exceptions 103, 105, 107, 109, 111, and 113) is read. Subsequently, the plurality of firewall exceptions are then intelligently associated with one or more of a plurality of firewall exception groups (e.g., group 117, 121, and 123). Each firewall exception group corresponds to a user experience. Also, one or more firewall exceptions Groups (e.g., group 117 and Group 121) can be associated with a higher level group (e.g., Group 125). In one embodiment, Group 125 and Group 123 are associated with Group 127. In one example, Group 127 is a single line item displayed to a user.

Further, in one example, individual firewall exceptions 103, 105, and 107 may all relate to a media player network sharing service and are associated with Group 117. In another example, firewall exceptions 109 and 111 may both relate to a printing service and are associated with Group 121. In yet another example, firewall exceptions 113 and 115 may both related to an online meeting service and are associated with Group 123. As illustrated, embodiments allow a long list of individual firewall exceptions to be intelligently organized into experience-based groups.

Figure 2A:
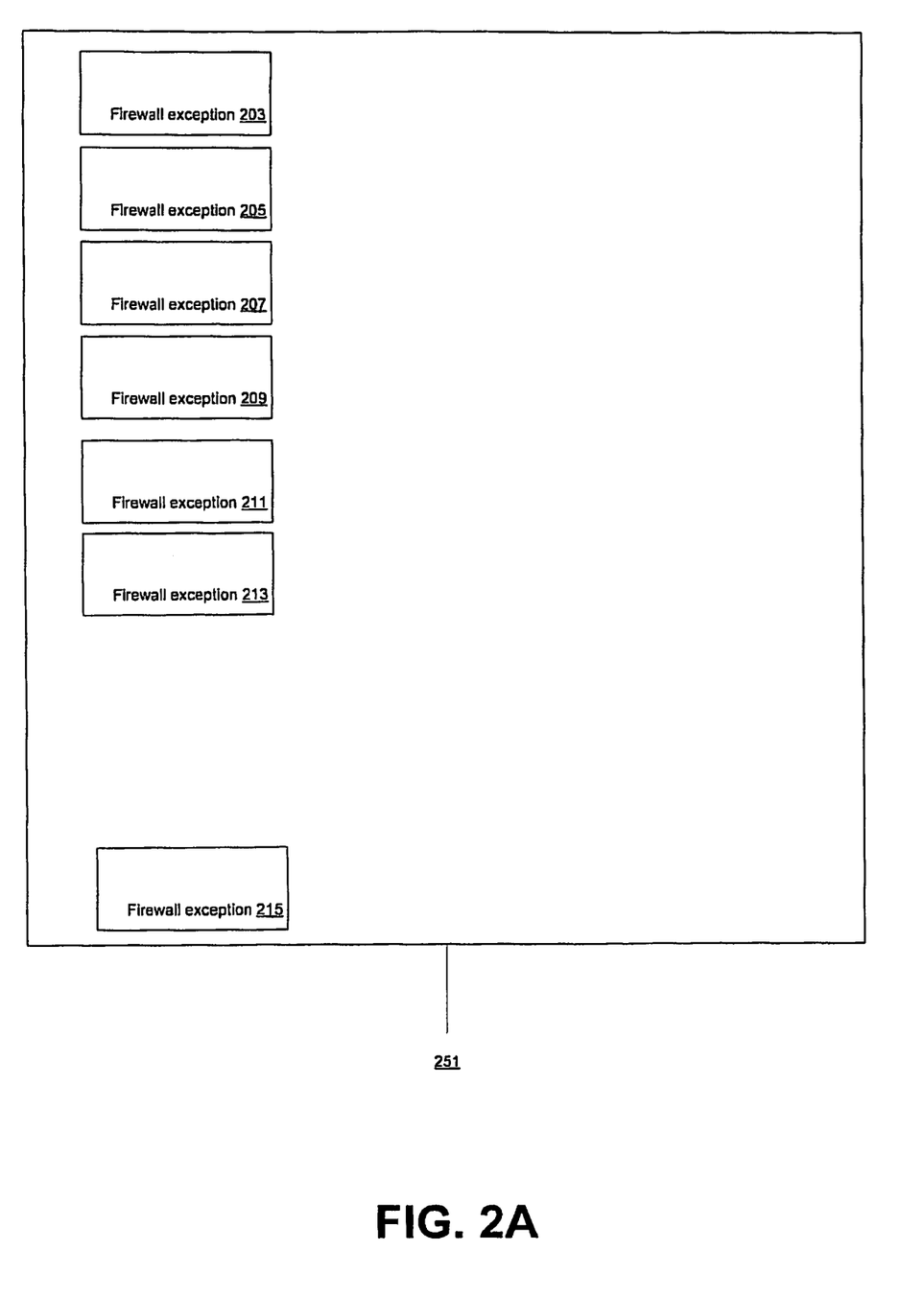
FIGS. 2A and 2B illustrate block diagrams of an embodiment of the present claimed subject matter in operation.
Figure 2B:
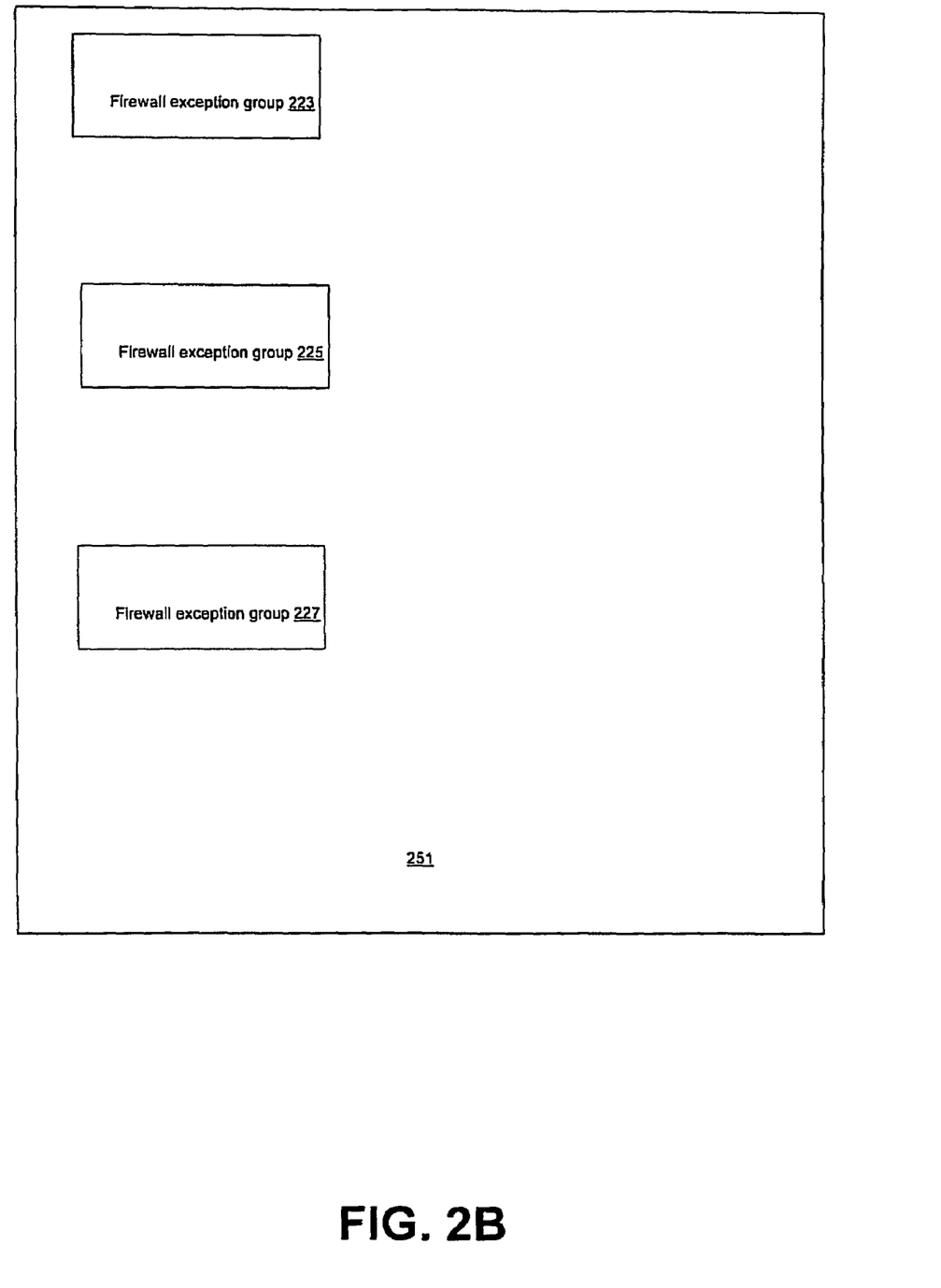

FIGS. 2A and 2B illustrate block diagrams of an embodiment of the present claimed subject matter in operation. FIG. 2A includes a firewall exceptions control panel 251, firewall exception 203, firewall exception 205, firewall exception 207, firewall exception 209, firewall exception 211, firewall exception 213, and firewall exception 215. In FIG. 2A, a plurality of firewall exceptions (203, 205, 207, 209, 211, 213, and 215) are accessed. Also, each of the firewall exceptions is related to a user experience (e.g., an application feature). In FIG. 2B, the plurality of firewall exceptions are collapsed into user experience groups, wherein each user experience group includes firewall exceptions that are related to a common experience.

In one example, firewall exceptions 203, 205, 207, and 209 are collapsed into firewall exception group 223. Further, firewall exceptions 211 and 213 are collapsed into firewall exception group 225. Moreover, firewall exception 215 is placed in firewall exception group 227.

Thus, embodiments provide computer users with a more efficient way of managing firewall exceptions. Embodiments automatically categorize and group individual firewall exceptions into application program feature groups. In one example, a computer user that wants to enable an application program feature can select a firewall exception group (e.g., firewall exception group 223) and all the firewall exceptions included in the group (e.g., firewall exceptions 203, 205, 207, and 209) would be automatically enabled.

Figure 3:
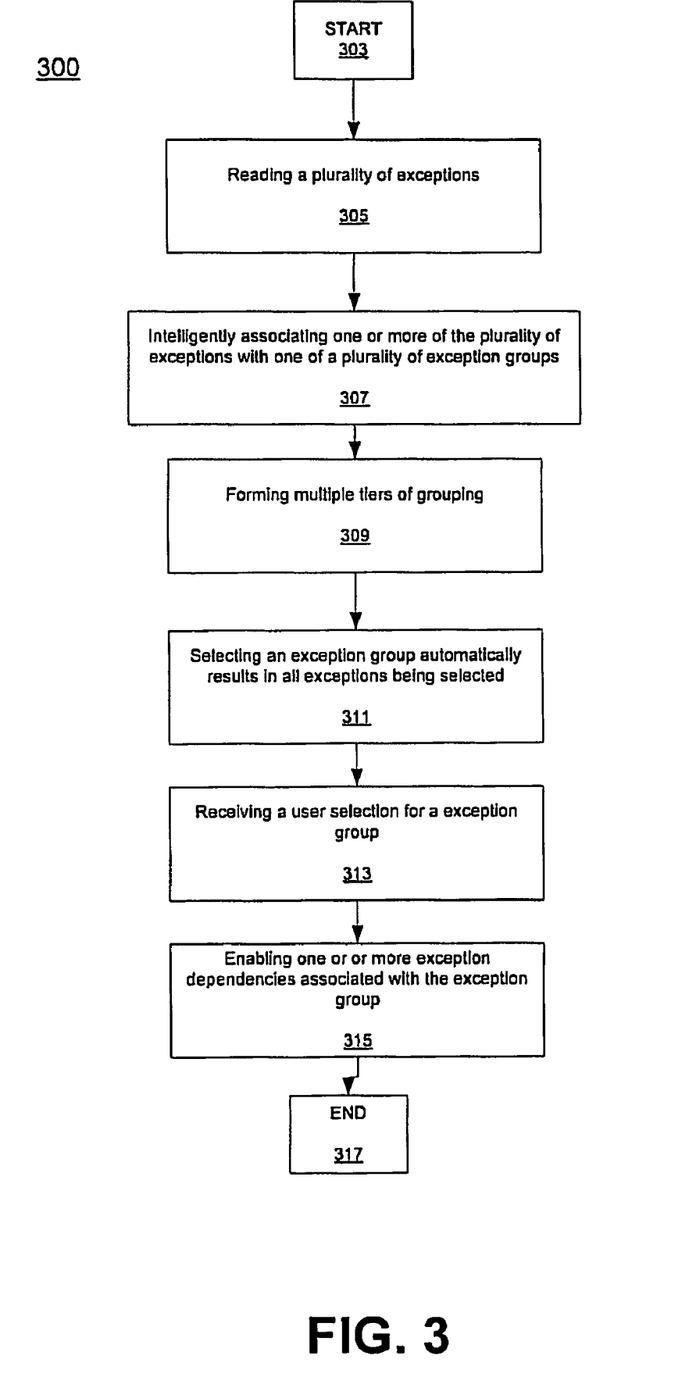
FIG. 3 illustrates a flowchart of an experience-based method for grouping firewall exceptions upon which embodiments in accordance with the present claimed subject matter can be implemented.

FIG. 3 illustrates a flowchart 300 of an experience-based method for grouping exceptions (e.g., firewall exception and/or virus scan exception) upon which embodiments in accordance with the present claimed subject matter can be implemented. Although specific steps are disclosed in flowchart 300, such steps are exemplary. That is, embodiments of the present claimed subject matter are well suited to performing various other or additional steps or variations of the steps recited in flowchart 300. It is appreciated that the steps in flowchart 300 can be performed in an order different than presented. At block 303, the process starts.

At block 305, a plurality of exceptions (e.g., firewall exception and/or virus scan exception) is read. In one embodiment, reading comprises accessing a user-defined list of exceptions (e.g., firewall exception and/or virus scan exception). In one embodiment, reading comprises accessing an application defined list of exceptions. In one embodiment, names of firewall exception groups are retrieved from an indirect reference (e.g., indirect string reference) from a resource library.

At block 307, one or more of the plurality of exceptions (e.g., firewall exception and/or virus scan exception) are intelligently associated with one of a plurality of firewall exception groups. In one embodiment, each firewall exception group corresponds to a common user experience. In one example, exceptions (e.g., firewall exception and/or virus scan exception) related to file sharing are associated with a file sharing firewall exception group. Also, in one embodiment, intelligently associating further comprises utilizing indirect string references in the plurality of exceptions (e.g., firewall exception and/or virus scan exception). Further, in one embodiment, a firewall exception group of the plurality of firewall exception groups is defined by a third party via a public application program interface such as a component object model (COM) firewall application program interface (API).

At block 309, multiple tiers of grouping are formed. In one embodiment, the plurality of firewall exception groups is placed into higher level groups. In one example, a first level of exceptions (e.g., firewall exception and/or virus scan exception) may be grouped to form second level firewall exception groups. The second level firewall exception groups may in turn be grouped to form third level firewall exception groups. In one instance, a user may only see the third level exceptions groups but not see the second level firewall exception groups.

At block 311, an exception group manipulated (e.g., selected) automatically results in all exceptions corresponding to the selected exception group being manipulated (e.g., selected). Thus, in one example, a user unfamiliar with exceptions (e.g., firewall exception and/or virus scan exception) management can still easily pick firewall exception groups related to specific application program features or user experiences that he or she can recognize.

At block 313, a manipulation command (e.g., a user selection and/or a programmatic command) for a firewall exception group is received. In one embodiment, user selection of a first firewall exception group associated with a first user experience does not interfere with a second user experience associated with a second firewall exception group.

At block 315, one or more firewall exception dependencies associated with the firewall exception group are enabled. In one embodiment, exceptions (e.g., firewall exception and/or virus scan exception) that are not included in, but are related to the firewall exception group, may also be automatically enabled. However, embodiments are not limited to enablement of firewall exception groups. In fact, embodiments apply to general manipulation of firewall groups. In one example, disablement of one firewall exception group automatically results in disablement of other related firewall exception groups. At block 317, the process ends.

Figure 4:
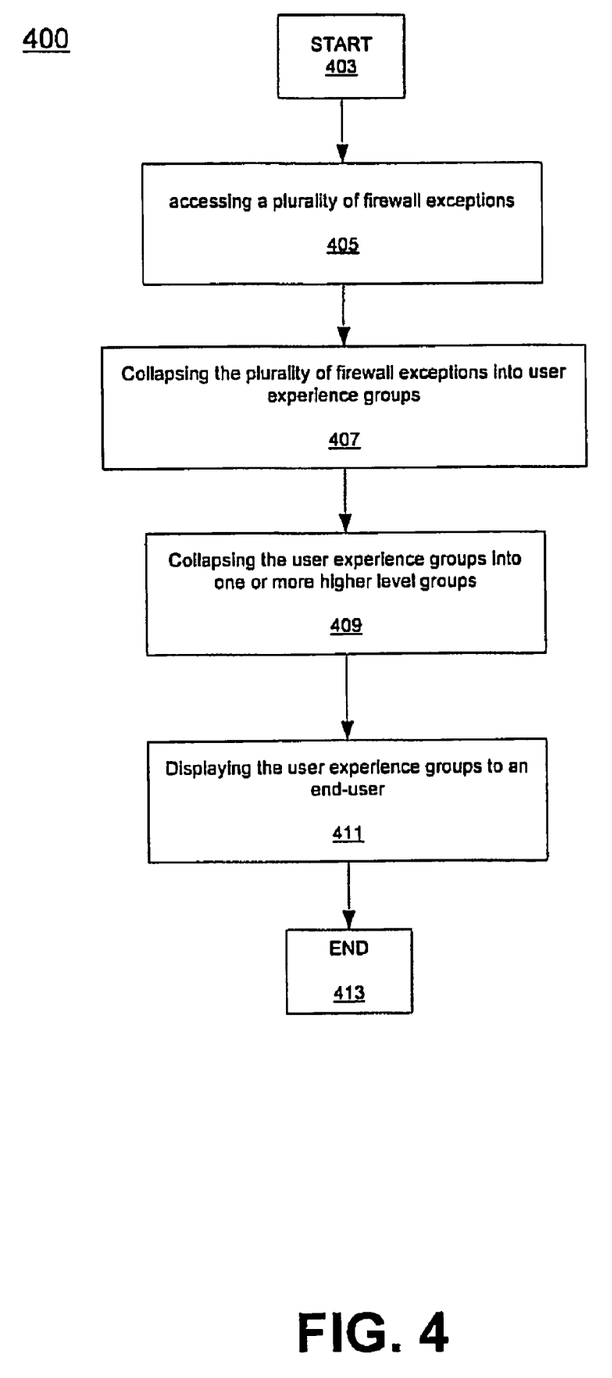
FIG. 4 illustrates a flowchart of a user experience-based method for collapsing firewall exceptions upon which embodiments in accordance with the present claimed subject matter can be implemented.

FIG. 4 illustrates a flowchart 400 of a user experience-based method for collapsing exceptions upon which embodiments in accordance with the present claimed subject matter can be implemented. Although specific steps are disclosed in flowchart 400, such steps are exemplary. That is, embodiments of the present claimed subject matter are well suited to performing various other or additional steps or variations of the steps recited in flowchart 400. It is appreciated that the steps in flowchart 400 can be performed in an order different than presented. At block 403, the process starts.

At block 405, a plurality of firewall exceptions is accessed. In one embodiment, each of the plurality of firewall exceptions is related to a user experience (e.g., an application program feature). In one embodiment, a firewall exception of the plurality of exceptions controls transmission control protocol traffic. Also, in one embodiment, wherein a firewall exception of the plurality of exceptions controls user datagram protocol traffic.

At block 407, the plurality of firewall exceptions are collapsed into user experience groups (e.g., a firewall exception group related to network printing). In one embodiment, each user experience group of the user experience groups includes one or more firewall exceptions (e.g., individual firewall exceptions related to network printing) that are related to a common user experience. Also, in one embodiment, enablement of a group automatically enables all firewall exceptions included in the group.

At block 409, the user experience groups are collapsed into one or more higher level groups. In one embodiment, a user experience group of the user experience groups is defined by an individual software vendor (e.g., a third party software vendor).

At block 411, the user experience groups are displayed to an end-user. At block 413, the process ends. In one embodiment, specific exceptions corresponding to the user experience groups are hidden from view as to prevent user confusion.

Thus, embodiments set forth method for grouping complicated sets of firewall exceptions under a single user-friendly line-item. Also, embodiments allow efficient authoring of exception groups that include all firewall exceptions for feature dependencies. Furthermore, embodiments ensure that all dependencies for a particular experience are enabled simultaneously. Combining these advantages, embodiments present users with a significantly simpler firewall exception management experience.

Figure 5:
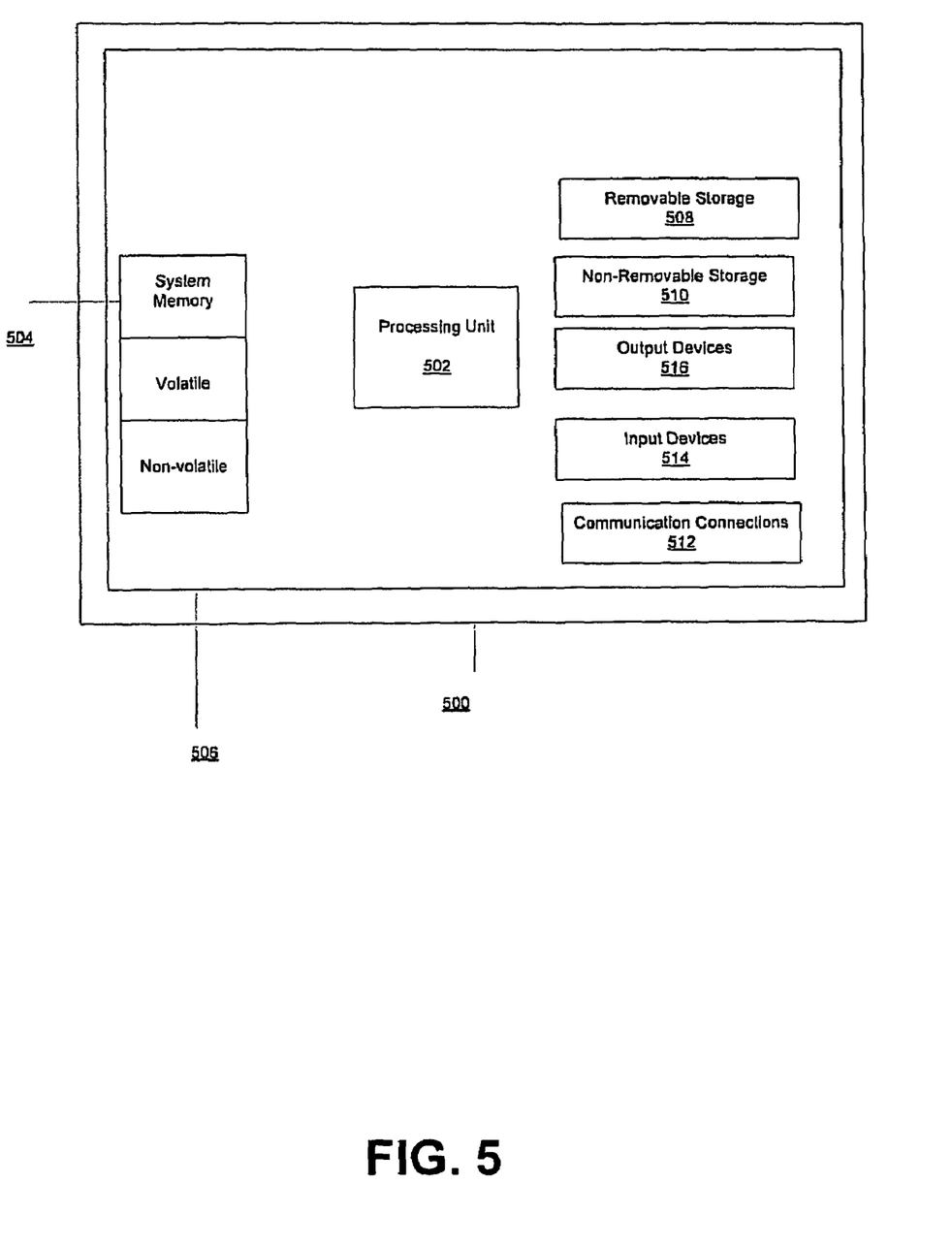
FIG. 5 illustrates an example of a suitable computing system environment on which the claimed subject matter may be implemented.

With reference to FIG. 5, an exemplary system for implementing the claimed subject matter includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

To summarize, embodiments allow a computer user to manage firewall exceptions in a simple and straightforward manner. Embodiments set forth methods of experience-based firewall exception grouping. In one example, a plurality of firewall exceptions is read. The plurality of firewall exceptions are then intelligently associated with one of a plurality of firewall exception groups, and each firewall exception group corresponds to a common user experience.

Different from traditional approaches that require a user to painstakingly go through a long list of individual firewall exceptions, embodiments automatically organizes firewall exceptions into groups. Each group corresponds to a common user experience or application program feature. Thus, when the computer user desires to allow a certain feature, he or she can simply select the firewall exception group corresponding to the feature, thereby avoiding having to select all the related individual firewall exceptions. Specifically, embodiments allow all dependencies for a particular experience to be enabled simultaneous as a firewall exception group is selected. Also, embodiments allow multiple tiers of hierarchical grouping. Thus, in one example, at the first level individual firewall exceptions are organized into first level groups, and these first level groups in turn, may be organized into second level groups. Moreover, embodiments are compatible with different ways of grouping firewall exceptions.

In the foregoing specification, embodiments have been described with reference to numerous specific details that may vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for grouping exceptions, said method comprising:
    reading, at a computer, a list of firewall exceptions related to different application program features of a particular application program on said computer, the list of firewall exceptions defined by said particular application program for a firewall configured to filter network traffic to said computer, wherein:
        said list of firewall exceptions defined by said particular application program includes a plurality of individual firewall exceptions associated with a particular application program feature of said particular application program, and
        each individual firewall exception of said plurality of exceptions associated with said particular application program feature needs to be enabled to allow said firewall to pass certain types of information to said computer for said particular application program feature to operate;
    retrieving a plurality of firewall exception groups for said particular application program, wherein each firewall exception group corresponds to a different application program feature of said particular application program;
    automatically organizing individual firewall exceptions of said list of firewall exceptions into said plurality of firewall exception groups, wherein all individual firewall exceptions of said plurality of firewall exceptions associated with said particular application program feature of said particular application program are automatically organized into a firewall exception group corresponding to said particular application program feature; and
    displaying said plurality of firewall exception groups to an end-user on a display of the computer for selection and enablement of one or more of said plurality of firewall exception groups, wherein:
        individual firewall exceptions to be enabled based on the selection and enablement of said one or more firewall exception groups are not displayed to said end-user for selection, and
        selection of said firewall exception group corresponding to said particular application program feature simultaneously enables:
            each individual firewall exception included in said firewall exception group corresponding to said particular application program feature, and
            all firewall exception dependencies associated with said firewall exception group corresponding to said particular application program feature that are included in different firewall exception groups corresponding to different application program features of said particular application program.

2. The method of claim 1, further comprising:
    forming multiple tiers of firewall exception groups, wherein said plurality of firewall exception groups is placed into a higher level group corresponding to said particular application program, and wherein selection of said higher level group automatically enables said plurality of firewall exception groups.

3. The method of claim 1, wherein said plurality of firewall exceptions associated with said particular application program feature includes individual firewall exceptions related to different network protocols.

4. The method of claim 1 further comprising:
    receiving a manipulation command for said firewall exception group corresponding to said particular application program feature;
    manipulating each individual firewall exception included in said firewall exception group corresponding to said particular application program feature; and
    manipulating all firewall exception dependencies associated with said firewall exception group corresponding to said particular application program feature that are included in different firewall exception groups corresponding to different application program features of said particular application program.

5. The method of claim 1, wherein selection of said firewall exception group corresponding to said particular application program feature automatically enables a different firewall exception group corresponding to a different application program feature of said particular application program.

6. The method of claim 1, further comprising:
    utilizing indirect string references in said plurality of firewall exceptions associated with said particular application program feature to automatically retrieve names of said plurality of firewall exception groups corresponding to said particular application program feature; and
    displaying each name of each firewall exception group as a single line item.

7. The method of claim 1, wherein a firewall exception group of said plurality of firewall exception groups is defined by a third-party application via an application program interface.

8. The method of claim 1, wherein said particular application program feature comprises a media player network sharing service.

9. The method of claim 1, wherein said particular application program feature comprises an online meeting service.

10. The method of claim 1, wherein individual firewall exceptions automatically enabled based on the selection and enablement of said firewall exception groups are not displayed to the end-user.

11. The method of claim 1, wherein said names of said plurality exception groups are retrieved from a resource library.

12. A computer-readable storage medium which does not consist of a signal, said computer-readable storage medium having computer-executable instructions stored thereon, wherein said computer-executable instructions, when executed, cause a computer to perform steps comprising:

accessing a list of firewall exceptions related to different application program features of a particular application program on said computer, the list of firewall exceptions defined by said particular application program for a firewall configured to filter network traffic to said computer, wherein:

said list of firewall exceptions defined by said particular application program includes a plurality of individual firewall exceptions associated with a particular application program feature of said particular application program, and each individual firewall exception of said plurality of firewall exceptions associated with said particular application program feature needs to be enabled to allow said firewall to pass a certain type of information to said computer for said particular application program feature to operate;

retrieving a plurality of firewall exception groups for said particular application program, wherein each firewall exception group corresponds to a different application program feature of said particular application program;

automatically organizing individual firewall exceptions of said list of firewall exceptions into said plurality of firewall exception groups, wherein all individual firewall exceptions of said plurality of firewall exceptions associated with said particular application program feature of said particular application program are automatically organized into a firewall exception group corresponding to said particular application program feature; and displaying said plurality of firewall exception groups to an end-user for selection and enablement of one or more of said firewall exception groups, wherein:

individual firewall exceptions to be enabled based on the selection and enablement of said one or more firewall exception groups are not displayed to the end-user for selection, and selection of said firewall exception group corresponding to said particular application program feature; simultaneously enables:

each individual firewall exception included in said firewall exception group corresponding to said particular application program feature, and all firewall exception dependencies associated with said firewall exception group corresponding to said particular application program feature that are included in different firewall exception groups corresponding to different application program features of said particular application program.

13. The computer-readable storage medium of claim 12, wherein enablement of said firewall exception group corresponding to said particular application program feature automatically enables a different firewall exception group corresponding to a different application program feature of said particular application program.

14. The computer-readable storage medium of claim 12, the steps further comprising collapsing said plurality of firewall exception groups into a higher level group corresponding to said particular application program, wherein selection of said higher level group automatically enables said plurality of firewall exception groups.

15. The computer-readable storage medium of claim 12, wherein a firewall exception group of said plurality of firewall exception groups is defined by an individual software vendor.

16. The computer-readable storage medium of claim 12, wherein automatically enabled firewall exceptions corresponding to selected firewall exception groups are hidden from view of the end-user.

17. The computer-readable storage medium of claim 12, the steps further comprising adding a new interface to a public component object model firewall application program interface for allowing a third party to define firewall exception groups.

18. The computer-readable storage medium of claim 12, wherein said plurality of firewall exceptions associated with said particular application program feature includes different firewall exceptions related to different network protocols.

19. The computer-readable storage medium of claim 18, wherein said different network protocols comprise User Datagram Protocol and Transmission Control Protocol.

20. A computer comprising:

a processor for executing computer program instructions; and memory storing computer program instructions for causing the computer to:

access a list of firewall exceptions related to different application program features of a particular application program on said computer, the list of firewall exceptions defined by said particular application program for a firewall configured to filter network traffic to said computer, wherein:

said list of firewall exceptions defined by said particular application program includes a plurality of individual firewall exceptions associated with a particular application program feature of said particular application program, and each individual firewall exception of said plurality of firewall exceptions associated with said particular application program feature needs to be enabled to allow said firewall to pass a certain type of information to said computer for said particular application program feature to operate;

retrieve a plurality of firewall exception groups for said particular application program, wherein each firewall exception group corresponds to a different application program feature of said particular application program, automatically organize individual exceptions of said list of firewall exceptions into said plurality of firewall exception groups, wherein all individual firewall exceptions of said plurality of firewall exceptions associated with said particular application program feature of said particular application program are automatically organized into a firewall exception group corresponding to said particular application program feature;

display said plurality of firewall exception groups to an end-user for selection and enablement of one or more of said firewall exception groups, wherein individual firewall exceptions to be enabled based on the selection and enablement of said one or more firewall exception groups are not displayed to the end-user for selection; and display a plurality of manipulation mechanisms corresponding to said firewall exception groups, wherein selection of a manipulation mechanism for enabling said firewall exception group corresponding to said particular application program feature simultaneously enables:

each individual firewall exception included in said firewall exception group corresponding to said particular application program feature, and all firewall exception dependencies associated with said firewall exception group corresponding to said particular application program feature that are included in different firewall exception groups corresponding to different application program features of said particular application program.

* * * * *

UNITED STATES PATENT AND TRADEMARK OFFICE
CERTIFICATE OF CORRECTION

| | |
|---|---|
| PATENT NO. | : 8,176,157 B2 |
| APPLICATION NO. | : 11/436804 |
| DATED | : May 8, 2012 |
| INVENTOR(S) | : Abzarian et al. |

It is certified that error appears in the above-identified patent and that said Letters Patent is hereby corrected as shown below:

In column 9, line 56, in Claim 12, delete "feature;" and insert -- feature --, therefor.

In column 10, line 64, in Claim 20, delete "program," and insert -- program; --, therefor.

Signed and Sealed this
Thirtieth Day of October, 2012

David J. Kappos
*Director of the United States Patent and Trademark Office*